United States Patent [19]
Wilhelm et al.

[11] Patent Number: 5,900,038
[45] Date of Patent: May 4, 1999

[54] CULTIVATION SUBSTRATE AND METHOD OF PREPARING THE SAME

[75] Inventors: Hermann-Josef Wilhelm; Maria Rogmans, both of Xanten, Germany

[73] Assignee: Allplant Entwicklungs- Und Marketing GmbH, Ratingen, Germany

[21] Appl. No.: 08/676,277

[22] PCT Filed: Dec. 6, 1994

[86] PCT No.: PCT/EP94/04064

§ 371 Date: Nov. 5, 1996

§ 102(e) Date: Nov. 5, 1996

[87] PCT Pub. No.: WO95/19328

PCT Pub. Date: Jul. 20, 1995

[30] Foreign Application Priority Data

Jan. 18, 1994 [DE] Germany .............................. 44 01 279

[51] Int. Cl.⁶ ................................. C01F 5/00; C01F 11/00
[52] U.S. Cl. .................................. 71/23; 71/903; 71/904; 47/1.01
[58] Field of Search .............................. 71/23, 24, 64.07, 71/64.11, 903, 906; 47/1.01

[56] References Cited

U.S. PATENT DOCUMENTS

| | | | |
|---|---|---|---|
| 2,498,480 | 2/1950 | Bierlich et al. | 71/23 |
| 2,547,730 | 4/1951 | Arnold et al. | 71/23 |
| 3,252,785 | 5/1966 | Hoblit | 71/23 |

FOREIGN PATENT DOCUMENTS

| | | | |
|---|---|---|---|
| 0 504 644 A1 | 9/1992 | European Pat. Off. | C05F 11/00 |
| 35 46 303 C2 | 2/1988 | Germany | C05F 5/00 |
| 38 05 536 A1 | 8/1989 | Germany | C05F 5/00 |
| 38 43 670 C1 | 9/1990 | Germany | C12P 1/00 |
| 39 29 075 C2 | 3/1991 | Germany | C05F 5/00 |
| 40 41 329 A1 | 6/1992 | Germany | G05F 5/00 |
| 43 08 304 C1 | 1/1994 | Germany | C05F 5/00 |

*Primary Examiner*—Gary P. Straub
*Attorney, Agent, or Firm*—Sughrue, Mion, Zinn, Macpeak & Seas, PLLC

[57] ABSTRACT

The present invention relates to a cultivation substrate and to a method of preparing the same. The cultivation substrate of the invention contains comminuted plants selected from among knot grass, $C_4$ plants and plants of the cannabis and Dicksonia genuses, and is suited as a peat substitute.

32 Claims, No Drawings

CULTIVATION SUBSTRATE AND METHOD OF PREPARING THE SAME

The present invention relates to a cultivation substrate and to a method of preparing the same.

Peat is predominantly used as a cultivation substrate in the horticultural sector. Biologically speaking, peat is the humus form of bogs, especially of upland moors which belong to the particularly endangered habitats. Numerous plants and animals that are living there are found on the Red List which names the species that are in danger of becoming extinct. Nevertheless, in the Federal Republic of Germany alone, about 1000 ha of moor area are drained every year due to peat cutting, and more than 8 million cubic meters of peat are used in private and commercial gardens every year. Bogs need up to 10,000 years for their development and they will be destroyed in only a few decades if peat cutting is not stopped. Managing without peat or, what is even better, a substitute for peat in private and commercial gardens will help to save the bogs.

The positve effects of peat, such as the improvement of the soil structure, are counteracted by a plethora of disadvantages:

Peat is not a fertilizer as the name "fertilizing peat" makes us believe, it is virtually without any plant nutrients.

Peat has a very low pH (pH 3–4), thus acidifying the soil. Such an acidification leads to nutrient deficiency and, in turn, requires additional and expensive fertilization that is harmful to the environment.

The water storing capacity of peat is very small. Peat loses its moisture very rapidly, thus supplying only very small amounts of humus as compared with other organic materials (compost, bark mulch).

In sandy soil the effect created by the use of peat mostly wears out very rapidly while carbonization may be observed in heavy loamy soil due to an inadequate supply of air.

An especially ineffective method consists in covering the soil with peat, as it is especially on the surface that peat dries out very easily. The positive effect created by soil covering cannot be achieved with peat.

Up to the present day several "peat substitutes" have already been developed that are capable of replacing part of the peat used for gardening:

Substitutes of an organic kind:
  bark products, composts, rice glumes, coconut fibers, cotton waste Substitutes of a mineral kind: expanded clay, expanded shale, rock wool, sand and gravel, pumice, lavalite, perlite, vermiculite, etc.

Substitutes of a synthetic kind:
  styromull, hygromull, plastic bristles, etc.

Some negative characteristics of these products often rule out the use of higher mixing amounts in cultivation substrates. Attention must be paid to the following criteria when such products are used:

salt content
nutrient content
nitrogen fixation
content of heavy metals and fibers detrimental to health (rock wool, plastic bristles, harmful organic substances)
water storing capacity
air capacity
structural stability
ion-exchange capacity
uniform quality
price
availability
transportation costs
eco-balance Peat substitutes of a mineral or synthetic kind have, most of the time, an excessively high content of salt and an inadequate structural stability; when they are used, a strong nitrogen bond and poor air management in the soil will be observed Moreover, synthetic substitutes are detrimental to health most of the time. Disposal and biological recycling also pose problems in the case of mineral and synthetic peat substitutes Organic peat substitutes that have so far been used are also disadvantageous For instance, compost from garden or kitchen waste, garbage or sludge mostly contains residues of pesticides, heavy metals, carcinogenic hydrocarbons, antibiotics or other foreign matter. Composting is often accompanied by a foul odor, and the above-mentioned foreign substances may also adversely affect the quality of the ground water through seeping water.

To sum up, there is no generally usable substitute on the market whose properties would even come close to those of younger peat. The air pore portion which is of importance to an optimum plant growth, as well as a high water retaining capacity could not be achieved with formerly known substitutes It has therefore been the object of the present invention to provide a material which has the essential chemical and physical properties of younger peat and has been improved such that, in comparison with younger peat, it has a more favorable pH, a higher amount of air pores and a higher fertilizer content Furthermore, the production of the material should be pro-environmental, inexpensive and standardizable.

The present invention provides for a cultivation substrate that is excellently suited as a peat substitute. The cultivation substrate of the invention contains comminuted plants selected from among knot grass, $C_4$ plants and plants of the cannabis and Dicksonia genuses.

The cultivation substrate preferably contains comminuted polyploid knot-grass plants The knot grass (Polygonum sachalinense, Reynoutria sachalinense or Reynoutria japonica) was imported into Europe from South Sakhalin, an island before the east coast of Russia, as an ornamental plant and a fodder plant in the middle of the last century. Since that time it has often been found in an uncultivated state along creeks or the outskirts of forests together with a related species, the Japanese knot grass. The advantage of knot grass is, among other things, that it regrows rapidly and can be harvested with conventional agricultural machinery without any high energy consumption. Perennials which have so far been known in uncultivated form have yielded 50 to 150 tons of fresh biomass per hectare and year. Another advantage is that no pesticides have to be used when knot grass is grown since pests have so far not been known.

Within the scope of the present ivnention, it has been possible to multiply the number of chromosomes (polyploidization) in knot grass by using colchicine, resulting in the cultivation of especially productive varieties. A crop yield of 200 to 500 tons of fresh biomass per hectare and year is achieved by growing polyploid knot grass. It will be shown in the following how a polyploidization could be achieved in knot grass:

1. Strong and frost-resistant knot grass plants were chosen from test fields; these plants are the starting material for in vitro propagation and for genetic assays.
2. For the preparation of a sterile culture young sprouts were sterilized in a 1% sodium hypochloride solution.
3. With the aid of a microscope the meristems of the plants were taken and applied in sterile form to a medium (Table 1). Since 80% to 90% of the removed meristems are not sterile, these cultures are overgrown in test tubes or pots by fungi or bacteria. To obtain a few sterile starting plants, thousands of meristems must be removed and cultivated.
4. Sterile meristems were then further propagated on different media, whereby an optimum propagation rate was determined. Clones for further propagation were thus produced within about 6 to 12 months.
4. Multiplication of the chromosomes was induced by adding colchicine to the growth medium. Colchicine is a substance contained in autumn crocus (Colchicum annuum) which acts as a mitosis inhibitor. Colchicine was dissolved in water and sterilized by means of filters because it is thermolabile. The concentration of the colchicine solution was in the range of from 0.01 to 0.50% by weight.
6. The treatment period was very short when a strong concentration of colchicine solution was used; with a weakly concentrated solution the treatment time was extended accordingly
7. After treatment the plants were washed with sterile water to remove the chemicals used. The meristems were subsequently placed on a culture medium in a closable pot and cultivated under artificial light (2000–2500 lux, 16 hours) at a suitable temperature (25+/−1° C.) and air humidity (50% relative humidity).
8. Since colchicine is highly toxic, only a few meristems survived this treatment and among these only a few had an increased number of chromosomes.
9. Each plant was assayed by means of a cytometer. It could be determined through the number of stomata and chloroplasts in the cells of the cuticle whether the number of chromosomes of the plant cells had changed. Polyploid plants have significantly more of these components. Furthermore, polyploidization can be recognized by an increase in the epidermis cells as compared with diploid cells.
10. An examination of the root tips showed definite results. To this end the chromosomes of the test plants were stained. The chromosomes became spiral to an extent that they could be counted under the microscope.
11. Polyploid plants or plant parts were further propagated and planted as seedlings on fields after a corresponding cultivation time.

TABLE 1

Composition of a Nutrient for the Propagation of Meristems of Knot Grass and $C_4$ Plants

| | |
|---|---|
| $CaCl_2.2H_2O$ | 440mg/l |
| $KH_2PO_4$ | 170mg/l |
| $KNO_3$ | 1900mg/l M S Macront |
| $NH_4 NO_3$ | 1650mg/l |
| $MgSO_4.7H_2O$ | 370mg/l |
| $CoCl_2.6H_2O$ | 0.025mg/l |
| $Na_2 MoO_4.2H_2O$ | 0.25mg/l |
| $CuSO_4.5H_2O$ | 0.025mg/l |
| KJ | 0.83mg/l M S Micro |

TABLE 1-continued

Composition of a Nutrient for the Propagation of Meristems of Knot Grass and $C_4$ Plants

| | |
|---|---|
| $H_3 BO_3$ | 6.2mg/l |
| $MnSO_4.4H_2O$ | 22.3mg/l |
| $Zn SO_4.7H_2O$ | 8.6mg/l |
| $NA_2.EDTA$ | 37.2mg/l |
| $FeSO_4.7H_2O$ | 27.8mg/l |
| nicotinic acid | 0.50mg/l |
| pyridoxins (vitamin $B_6$) | 0.50mg/l |
| thiamins (vitamin $B_1$) | 1.0mg/l |
| sugar | 30.0g/l |
| agar-agar | 6.5g/l |
| BAP (6-benzyl-amino-purine | 2.0mg/l |
| NAA (1-napthyl acetic acid | 0.01mg/l |
| GA3 (gibberillic acid) | 1.0mg/l |
| adenine sulfate | 80.0mg/l |

Acenaphthene can also be used for the polyploidization of knot grass. Since acenaphthene is not soluble in water, crystals of this substance are applied in undissolved form to the vegetation point of the meristems. Furthermore, the plant parts to be treated are placed under glass bells whose insides have also applied thereto acenaphthene crystals.

A steam pressure of the sublimated substance, on whose level the treatment period depends, is formed under the glass bell in response to the temperature Knot grass plants which have high biomass yields can also be obtained through the specific selection of spontaneously mutated plants or plant parts.

It has been found that a cultivation substrate produced on the basis of knot grass contains substances which strenghten the plants embedded therein and protect them against possible fungal attack, such as mildew or rust and the bacterial disease fire blight. Plants which have been potted into this cultivation substrate show specific metabolic changes. The concentrations of various enzymes in the plants already rise a few hours after potting. This includes the chitinases which are capable of decomposing the components of the cell walls of fungi. It is therefore safe to assume that these metabolic products play a considerable role-in defending the plants against fungal attack Other enzymes which can effect further defense reactions of the plants are also produced to an increased degree On the whole, the mechanism which underlies the resistance induced by the substrate of the invention is very complicated and has not been clarified yet in every respect.

The cultivation substrate according to the invention contains comminuted $C_4$ plants in addition to or instead of comminuted knot-grass plants.

A number of plant species that are characterized by high photosynthesis rates are designated as $C_4$ plants. These are based on an effective carbon dioxide exploitation, even when the amount of $CO_2$ is small. The first detectable reaction product is a $C_4$ body (oxalacetate, malate, aspartate) in contrast to the $C_3$ body 3-phospoglyceric acid in $C_3$ plants. The morphology of $C_4$ plants differs from those of $C_3$ plants in that the assimilating cells are arranged in $C_4$ plants in the manner of a wreath around the vascular bundles of the leaves whereas these are normally laminated in $C_3$ plants.

Preference is given to a cultivation substrate which contains comminuted $C_4$ plants from the genuses Sorghum, Miscanthus, Andropogon, Coelorhachis, Coix, Cymbopogon, Echinoloa, Erianthus, Hyparrhenia, Leptochloa, Panicum, Paspalum, Pennisetum, Saccharum, Schizachyrum, Spartina, Sporobolus, Themeda, Thripsacum, Vetiveria and/or Zea.

In an especially preferred embodiment, the cultivation substrate of the invention contains comminuted $C_4$ plants of the species: *Sorghum allmum, Sorghum halapense, Sorghum versicolor,* (variety: CV-Silk), *Sorghum bicolor* vr. *arundinacaeum, Sorghum bicolor* var. *verticilliflorum, Sorghum caucasicum, Sorghum drummondii, Sorghum giganteum, Sorghum milliaceum, Sorghum milliaceum* var. *parvispiculum, Sorghum nidium, Sorghum pugionifolium, Sorghum serratum, Sorghum stapffii, Sorghum sudanense, Sorghum vulgare, Sorghum zizanioides* and *Sorghum adans.*

In making selections on tests fields for many years, the inventors succeeded in making the most important varieties of the $C_4$ plant species hardy for the European climate, namely *Sorghum allmum, Sorghum bicolor* (variety: CV-Silk) and *Sorghum halapense.*

To obtain especially productive $C_4$ plants, the polyploidization methods described above for knot grass may be carried out. Since $C_4$ plants belong to monocotyledonae whose apical meristems are well protected by leaves, the coleoptile is cut shortly above the apical meristem in the embryonal stage, and colchicine is applied to the torso. After a few days the leaf system is built up again by regrowing young leaves.

As far as $C_4$ plants are concerned, germinated seeds can also be exposed to a thin layer of colchicine solution in Petri dishes for about 3 to 4 hours. The most advantageous concentration of the aqueous colchicine solution depends on the species. It varies with $C_4$ grasses between 0.05–0.4%. During treatment the seeds must be checked at regular intervals, especially when colchicine is applied for a longer time. When the roots become thick, the treatment has to be stopped. The seeds are then washed thoroughly and sown in transplanting containers.

Furthermore, comminuted plants of the genuses cannabis (hemp) and Dicksonia (tree fern) yield the cultivation substrate of the invention. Preference is given to a cultivation substrate of comminuted plants of the species *Cannabis sativa, Cannabis sativa* ssp. *indica, Cannabis sativa* ssp. *sativa, Cannabis sativa* ssp. *sativa gigantea* (var. *chinensis*), *Cannabis sativa* ssp. *sativa* (Dc., *Cannabis gigantea* Del. ex. Vilm; giant hemp) or *Dicksonia antarctica.*

The cultivation substrate preferably contains comminuted knot grass and/or $C_4$ plants having a natural residual moisture of from 15% to 25%, especially preferred are from 18% to 20%. Plants with such a residual moisture can be obtained by leaving the same on the stem until they stop growing in autumn because of the season and relocate the nutrients from the plant parts above the ground into the root rhizome. As soon as the plants have reached the above-mentioned residual moisture, they will be harvested by means of agricultural machinery and the chopped biomass will then be coarsely or finely ground, for instance by means of a drivable hammer mill.

For the comminution of the plants, use can e.g. be made of drum choppers, drum shredders, disc choppers, two-circuit mills, pressureless refiners or pressure refiners, bark mills, chip fragmentizers, top-layer mills, chip shredders, impact shredders or similar machinery that is suited for disintegrating shreds, chips and annuals.

During the comminution process, or thereafter, additives may be added, depending on the later use of the cultivation substrate.

Such additives may e.g. be vegetable oils. The admixture of vegetable oils prevents the formation of dust by the cultivation substrate of the invention. For instance, soybean, rape or sunflower oil may be used as vegetable oil. 1 to 5 l of vegetable oil are advantageously mixed with 1 m³ cultivation substrate.

Furthermore, polyacrylamide granules, clay mineral mixtures, ground lava rock, pumice, bentonite, sand, waste paper, fly ash from brown-coal combustion, brown-coal waste and all kinds of fertilizers are suited as additives.

Polyacrylamide granules improve the cultivation substrate of the invention in that it possesses a high water storing capacity. Gelling cross-linked polyacrylamide granules, as are e.g. obtainable under the name Polywater-Aqua-Plus® from Polyplant GmbH, Xanten, are especially advantageous.

The addition of clay mineral mixtures to the cultivation substrate of the invention allows the formation of clay-humus complexes.

Furthermore, organic additives, such as seeaweed extract, ground castor powder, horn chips, horn meal, blood meal, softwood chips, cotton waste, flax waste, textile waste, coconut fibers and leaf mold, are advantageously suited.

A liquid seaweed extract can e.g. be produced according to standard methods on the basis of *Ascophyllum nodosum.* Seaweed extract can for e.g. be bought under the name Maxicrop Triple® from Maxicrop International Ltd., Norway.

Furthermore, nitrogen-fixing bacteria, plant hormones, vitamins, fungicides and amino acids can be used as additives for special applications of the cultivation substrate of the invention.

For instance, bacteria of the genus Azotobacter are suited as nitrogen-fixing bacteria An Azotobacter-containing preparation for use in the agricultural field is obtainable under the name "Krishio Mitra Liquid Bioferiliser®" from Suyash Sankalp Exports Pvt. Ltd., Pune, India. Auxins, cytokinins, gibberellins, etc can be used as plant hormones. Vitamins can be chosen from among thiamin, riboflavin, pyridoxine, cobalamin, nicotinic acid, pantothenic acid, folic acid and biotin.

A preparation which contains a mixture that consists of plant hormons, vitamins, fungicides, amino acids and other nutrients and is suited as an additive for the cultivation substrate according to the invention can be obtained under the name "Vitormone®" from Suyash Sankalp Exports Pvt. Ltd., Pune, India.

The following Table 2 compares the properties of a cultivation substrate of the invention of comminuted Sorghum allmum plants with those of younger peat:

TABLE 2

Characteristics of the cultivation substrate according to the invention of Sorghum allmum plants as compared with younger peat

| Characteristics | Cultivation Substrate of the Invention | Younger Peat |
| --- | --- | --- |
| pH | 6.2 | 3.0–4.5 |
| dry weight in % | 86.945% | 20.0–30.0% |
| total N in % | 0.34% | 0.8–1.2% |
| total P in % | 1.70% | 0.01–0.04% |
| total K in % | 3.70 | 0.01–0.03% |
| C/N ratio | 30:1 | 30:50 |
| volume weight, dry, in g/l | 220 g/l | 55–75 g/l |
| volume weight, moist, in g/l | 1510 g/l | 150–180 g/l |

As can be learnt from the above table, the cultivation substrate according to the invention is very rich in nutrients and thus excellently suited as a peat substitute. Like all organic materials, the substrate is subject to a natural microbial decomposition in the course of time. Since the above-mentioned plants are biomasses having great amounts of lignin and pulp, the cultivation substrate is only decomposed at a slow rate and is predominantly converted into durable humus. It improves the structure of soil, prevents soil compaction or crusting, increases the soil temperature and is compatible with organisms living in soil. The cultivation substrate according to the invention is not phytotoxic. It is excellently suited for gardening, landscape tending and commerical horticulture, for fruit, vegetable and wine cultivation and for forestry. Furthermore, it can be used as garden mold. Since the substrate binds moisture, prevents the formation of bad smells, does not stick together and remains elastic for a long time, it is especially suited as litter in the keeping of animals, especially as cat litter The following Table 3 is a comparative analysis between younger peat, black peat and the cultivation substrate of the invention:

TABLE 3

| No. Property | Younger Peat | | | Black Peat | | | Cultivation Substrate of the Invention | | |
|---|---|---|---|---|---|---|---|---|---|
| | 1 | 2 | 3 | 1 | 2 | 3 | 1 | 2 | 3 |
| 1. pro-environmental general | | | | | * | | | * | * |
| 2. proenvironmental in production | | | | | * | | | * | * |
| 3. energy consumption during production | * | | | | * | | | | * |
| 4. transportation distances (short distance) | | | | | * | | | * | * |
| 5. production variants, e.g. | | | | | | | | | |
| structure | | * | | | | | | * | * |
| Water content | | | | | * | | | * | * |
| chemical properties | | | | | * | | | * | * |
| other products | | | | | * | | | * | * |
| 6. Water retaining capacity | * | | | | *_* | | | | * |
| 7. coarse pore volume | | * | | | | | | * | * |
| 8. N-bond C/N ratio | * | | | | * | | | | * |
| 9. buffering capacity | | *_* | | | * | | | | * |
| 10. Wettability | | * | | | | | *_* | | * |
| 11. structural stability | | * | | | * | | | | * |
| 12. peat-like properties, chem. | * | | | | * | | | * | |
| 13. peat-like properties, color | * | | | | * | | | | * |
| 14. quality, medium-term | | * | | | | | | * | * |
| 15. dependence on site | | * | | | | | | * | * |

It should be noted that stable manure (cattle, pig, chicken or horse dung) can be fermented together with the biomass of the invention consisting of comminuted useful plants, in particular knot grass or $C_4$ plants The spreading of non-fermented stable manure on arable soils poses various problems The most important negative effects shall here be briefly summarized as follows:

stack manure damages the roots of the plants because of the content of harmful substances (indole, skatole, putrescine, cadaverine, etc);

root inhibiting substances are released during the decomposition of fresh organic substance by micro-organisms;

stack manure contains viable weed seeds and pathogens;

pests and insects, such as potato beetles, are attracted by decaying manure;

stack manure can inhibit the mineral take-up of the plants because of an "ion competition".

It is only the simultaneous fermentation of stable manure and cultivation substrate of the invention that yields a fertilizer which can safely be used.

Furthermore, the invention relates to a method of preparing a cultivation substrate, the method comprising the following steps, a) harvesting plants selected from among knot grass, $C_4$ plants and plants of the cannabis and Dicksonia genuses;

b) comminuting the plants; and optionally c) mixing the resultant biomass with at least one additive.

As already mentioned above, preferably polyploid knot grass and $C_4$ plants of the above-mentioned genuses or species are suited for cultivation.

The agriculturally cultivated plants can be harvested by means of agricultural machinery, such as a row-independent corn head, and can subsequently be ground coarsely or finely by means of the above-mentioned machinery.

The plants are preferably harvested at a time when the plants have a natural residual moisture of from 15% to 25% due to the season.

The comminuted plants can preferably be mixed with the above-mentioned additives.

It is especially advantageous to compost the harvested and comminuted knot grass and/or $C_4$ plants or plants of the cannabis and Dicksonia genuses optionally together with at least one of the above-mentioned additives according to standard methods.

Examples of especially preferred compositions of the cultivation substrate of the invention are given as follows:

1. per cubic meter of cultivation substrate:
    70 parts of comminuted plants
    20 parts of sand
    10 parts of polyacrylamide granules, grain size 1–3 mm
    1 kg of algal extract, dissolved in 50 l of water and intermixed 2. per cubic meter of cultivation substrate:
    70 parts of comminuted plants
    29 parts of pumice
    1 part of polyacrylamide granules, grain size 1–3 mm
    1 kg of algal extract 3. per cubic meter of cultivation substrate:
    60 parts of comminuted plants
    39 parts of waste paper, shredded and moistened
    1 part of polyacrylamide granules, grain size 1–3 mm
    1 kg of algal extract 4. per cubic meter of cultivation substrate:
    500 parts of *Sorghum allmum* or *Sorghum halapense*, dry, shredded, 1–3 mm
    500 parts of *Miscanthus sinensis giganteus*, dry-shredded, 1–5 mm
    5–15 kg of clay mineral mixture 1 (Table 4)
    5–15 kg of clay mineral 3 (Table 6)
    2.5–5 kg of coarse castor powder or
    1 kg of algal extract 5. per cubic meter of cultivation substrate:
    333 parts of *Sorghum allmum* or *Sorghum halapense* or other Sorghum species, dry-shredded, 1–3 mm
    333 parts of *Miscanthus sinensis giganteus* or *Miscanthus sinensis* or straw or Tompinambur (biomass above ground, 18–20% residual moisture, dry-shredded, 1–5 mm
    333 parts of waste paper, shredded into 0.5 mm stripes
    5–15 kg of clay mineral mixture 2 (Table 5)

5–15 kg of clay mineral mixture 3 or
1 kg of Polywater-Aqua-Plus®, 1–3 mm grain size
4–5 kg of horn chips or 2–3 kg of horn meal or 1 kg of blood meal or
1 kg of algal extract 6. per cubic meter of cultivation substrate:
   333 parts of *Sorghum allmum* or *Sorghum halapense*, dry-shredded, 1–3 mm
   333 parts of softwood chips
   150 parts of waste paper in 0.5 mm stripes or as pulp or as paper sludge
   183 parts of *Miscanthus sin. gig.* or *Miscanthus sin.* 1–2 mm
   1–2 kg of urea or algal extract, dissolved in 10 to 50 l of water, mixed with the above-mentioned mass
   5–15 kg of clay mineral mixture 2
   1 kg of Polywater-Aqua-Plus®, 1–3 mm grain size or
   10–15 kg of clay mineral mixture 3

7. per cubic meter of cultivation substrate:
   333 parts of *Sorghum allmum* or *Sorghum halapense* or other Sorghum species, dry-shredded, 1–3 mm
   333 parts of ground cotton waste or ground flax waste (flax tow) or ground textile waste or coconut fibers or fly ash from brown-coal combustion or brown-coal waste, leaf mold or waste paper, paper sludge or paper pulp
   333 parts of *Miscanthus sin. gig.* or *Miscanthus sin.*
   1–2 kg of urea or horn chips or blood meal or ground castor powder or algal extract, dissolved in 10–50 l of water, mixed with the above-mentioned mass
   5–15 kg of clay mineral mixture 2
   1 kg of Polywater-Aqua-Plus®, 1–3 mm grain size or clay mineral mixture 3

8. per cubic meter of cultivation substrate:
   333 parts of Sorghum, dry-shredded, 1–3 mm
   333 parts of waste paper 0.5 mm, shredded and moistened
   333 parts of sand and pumice, pumice 1–3 mm, in equal parts
   5–15 kg of clay mineral mixture 2
   1 kg of Polywater-Aqua-Plus®, 1–3 mm grain size or clay mineral mixture 3
   1–2 kg of urea or horn chips or horn meal or blood meal or coarse castor powder, or algal extract, dissolved in 10–15 l of water, mixed with the above mass.

To avoid the formation of mold in the cultivation substrate when the latter is stored in sacks for a long period of time, the substrate should have a residual moisture of not more than 18%. Alternatively, preservatives may be added. Biological preservatives, such as madder roots, are especially recommended.

TABLE 4

Clay Mineral Mixture 1

| components | mineral composition | |
|---|---|---|
| clay minerals | montmorillonite | 70–75% |
| | illite | 15–20% |
| | quartz | 3–5% |
| Main accompanying minerals: | feldspar and mica | |
| | high ion-exchange capacity | |
| Chemical Analysis: | | |
| silicic acid ($SiO_2$) | 56.5% | |
| aluminum oxide ($Al_2O_3$) | 20.8% | |
| iron oxide ($Fe_2O_3$) | 5.0% | |

TABLE 4-continued

| titanium oxide ($TiO_2$) | 0.3% |
|---|---|
| calcium oxide (CaO) | 2.1% |
| magnesium oxide (MgO) | 3.4% |
| potassium oxide ($K_2O$) | 1.4% |
| sodium oxide ($Na_2O$) | 2.3% |
| ignition loss | 8.3% |
| Micronutrients | manganese, copper, boron |
| pH (8% aqueous suspension) | 9 |
| | water binding capacity reversible (high) |
| cation-exchange capacity | 40–50 mval/100 g/dry clay |
| efficient (specific) surface | 5–7 ha/1 kg dry clay |

TABLE 5

Clay Mineral Mixture 2

| silica ($SiO_2$) | 50.5% |
|---|---|
| alumimum oxide ($Al_2O_3$) | 24.0% |
| titanium oxide ($TiO_2$) | 4.0% |
| iron oxide ($Fe_2O_3$) | 13.5% |
| calcium oxide (CaO) | 3.0% |
| magnesium oxide (MgO) | 3.4% |
| potassium oxide ($K_2O$) | 0.6% |
| sodium oxide ($Na_2O$) | 10.0% |
| ignition loss | 10.0% |

Trace Elements

| lead | 5.0 mg/kg |
|---|---|
| boron | 120.0 mg/kg |
| cadmium | 20.2 mg/kg |
| chromium | 95.0 mg/kg |
| cobalt | 43.0 mg/kg |
| copper | 39.0 mg/kg |
| nickel | 52.0 mg/kg |
| zinc | 110.0 mg/kg |
| manganese | 1600.0 mg/kg |

Other Data:

| pH | 5.2% |
|---|---|
| T value | 75 mval (100 g) |
| N | 23 mg/l |
| $P_2O_5$ | 277 mg/l |
| $K_2O$ | 203 mg/l |
| Mg | 559 mg/l |
| salt (as KCl) | 0.23 g/l |

TABLE 6

Clay Mineral Mixture 3

| bulk density, graininess | 0.5–3.5 mm, 770 g/l |
|---|---|
| porosity | 52% |
| water capacity per 1 of mineral granules: | 600–800 $cm^3$, depending on graininess |
| pH | neutral on the long run |
| color of the granules | red-yellow-brown |
| resistant to acids, alkalis and frost | |

Chemical Analysis (approximate values)

| silica ($SiO_2$) | about 60.00% |
|---|---|
| aluminium oxide ($Al_2O_3$) | about 23.00% |
| titanium oxide ($TiO_2$) | about 1.90% |
| iron oxide ($Fe_4O_3$) | about 3–8% |
| calcium oxide (CaO) | about 0.20% |
| magnesium oxide (MgO) | about 0.80% |
| potassium oxide ($K_2O$) | about 2.20% |
| sodium oxide ($Na_2O$) | about 0.30% |
| free from carbonate and sulfate | |

We claim:

1. A cultivation substrate comprising at least one comminuted knot grass plant, characterized by containing per cubic meter of cultivation substrate:
   70 parts of comminuted plants;
   20 parts of sand;
   10 parts of polyacrylamide granules, grain size 1–3 mm;
   1 kg of algal extract, dissolved in 50 l of water and intermixed.

2. A cultivation substrate comprising at least one comminuted plant wherein the plant is a $C_4$ plant, characterized by containing per cubic meter of cultivation substrate:
   70 parts of comminuted plants;
   20 parts of sand;
   10 parts of polyacrylamide granules, grain size 1–3 mm;
   1 kg of algal extract, dissolved in 50 l of water and intermixed.

3. A cultivation substrate comprising at least one comminuted plant wherein the plant is of the cannabis genus, characterized by containing per cubic meter of cultivation substrate:
   70 parts of comminuted plants;
   20 parts of sand;
   10 parts of polyacrylamide granules, grain size 1–3 mm;
   1 kg of algal extract, dissolved in 50 l of water and intermixed.

4. A cultivation substrate comprising at least one comminuted plant of the Dicksonia genus, characterized by containing per cubic meter of cultivation substrate:
   70 parts of comminuted plants;
   20 parts of sand;
   10 parts of polyacrylamide granules, grain size 1–3 mm;
   1 kg of algal extract, dissolved in 50 l of water and intermixed.

5. A cultivation substrate comprising at least one comminuted knot grass plant, characterized by containing per cubic meter of cultivation substrate:
   70 parts of comminuted plants;
   29 parts of pumice;
   1 part of polyacrylamide granules, grain size 1–3 mm;
   1 kg of algal extract.

6. A cultivation substrate comprising at least one comminuted plant wherein the slant is a $C_4$ plant, characterized by containing per cubic meter of cultivation substrate:
   70 parts of comminuted plants;
   29 parts of pumice;
   1 part of polyacrylamide granules, grain size 1–3 mm;
   1 kg of algal extract.

7. A cultivation substrate comprising at least one comminuted plant wherein the plant is of the cannabis genus, characterized by containing per cubic meter of cultivation substrate:
   70 parts of comminuted plants;
   29 parts of pumice;
   1 part of polyacrylamide granules, grain size 1–3 mm;
   1 kg of algal extract.

8. A cultivation substrate comprising at least one comminuted plant wherein the plant is of the Dicksonia genus, characterized by containing per cubic meter of cultivation substrate:
   70 parts of comminuted plants;
   29 parts of pumice;
   1 part of polyacrylamide granules, grain size 1–3 mm;
   1 kg of algal extract.

9. A cultivation substrate comprising at least one comminuted knot grass plant, characterized by containing per cubic meter of cultivation substrate:
   60 parts of comminuted plants;
   39 parts of waste paper, shredded and moistened;
   1 part of polyacrylamide granules, grain size 1–3 mm;
   1 kg of algal extract.

10. A cultivation substrate comprising at least one comminuted plant wherein the plant is a $C_4$ plant, characterized by containing per cubic meter of cultivation substrate:
    60 parts of comminuted plants;
    39 parts of waste paper, shredded and moistened;
    1 part of polyacrylamide granules, grain size 1–3 mm;
    1 kg of algal extract.

11. A cultivation substrate comprising at least one comminuted plant wherein the plant is of the cannabis genus, characterized by containing per cubic meter of cultivation substrate:
    60 parts of comminuted plants;
    39 parts of waste paper, shredded and moistened;
    1 part of polyacrylamide granules, grain size 1–3 mm;
    1 kg of algal extract.

12. A cultivation substrate comprising at least one comminuted plant wherein the plant is of the Dicksonia genus, characterized by containing per cubic meter of cultivation substrate:
    60 parts of comminuted plants;
    39 parts of waste paper, shredded and moistened;
    1 part of polyacrylamide granules, grain size 1–3 mm;
    1 kg of algal extract.

13. A cultivation substrate comprising at least one comminuted knot grass plant, characterized by containing per cubic meter of cultivation substrate:
    500 parts of Sorghum sp., dry, shredded, 1–3 mm;
    500 parts of Miscanthus sinensis giganteus, dry-shredded, 1–5 mm;
    5–15 kg of a clay mineral mixture of 70–75% montmorillonite, 15–20% illite and 3–5% quartz, with feldspar and mica as main accompanying minerals, with approximate chemical analysis: 56.5% $SiO_2$, 20.8% $Al_2O_3$, 5.0% $Fe_2O_3$, 0.3% $TiO_2$, 2.1% CaO, 3.4% MgO, 1.4% $K_2O$, $Na_2O$ 2.3%, with manganese, copper and boron micronutrients;
    5–15 kg of a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$, carbonate-free and sulfate-free;
    2.5–5 kg of coarse castor powder or 1 kg of algal extract.

14. A cultivation substrate comprising at least one comminuted plant wherein the plant is a $C_4$ plant, characterized by containing per cubic meter of cultivation substrate:
    500 parts of Sorghum sp, dry, shredded, 1–3 mm;
    500 parts of Miscanthus sinensis giganteus, dry-shredded, 1–5 mm;
    5–15 kg of a clay mineral mixture of 70–75% montmorillonite, 15–20% illite and 3–5% guartz, with feldspar and mica as main accompanying minerals, with approximate chemical analysis: 56.5% $SiO_2$, 20.8% $Al_2O_3$, 5.0% $Fe_2O_3$, 0.3% $TiO_2$, 2.1% CaO, 3.4% MgO, 1.4% $K_2O$, $Na_2O$ 2.3%, with manganese, copper and boron micronutrients;

5–15 kg of a clay mineral mixture having approximate chemical analysis of about 60% SiO$_2$, 23% Al$_2$O$_3$, 1.9% TiO$_2$, 3–80 Fe$_4$O$_3$, 0.2% CaO, 0.8% MgO, 2.2% K$_2$O and 0.3% Na$_2$O, carbonate-free and sulfate-free;

2.5–5 kg of coarse castor powder or 1 kg of algal extract.

15. A cultivation substrate comprising at least one comminuted plant wherein the plant is of the cannabis genus, characterized by containing per cubic meter of cultivation substrate:

500 parts of Sorghum sp, dry, shredded, 1–3 mm;

500 parts of Miscanthus sinensis giganteus, dry-shredded, 1–5 mm;

5–15 kg of a clay mineral mixture of 70–75% montmorillonite, 15–20% illite and 3–5% quartz, with feldspar and mica as main accompanying minerals, with approximate chemical analysis: 56.5% SiO$_2$, 20.8% Al$_2$O$_3$, 5.0% Fe$_2$O$_3$, 0.3% TiO$_2$, 2.1% CaO, 3.4% MgO, 1.4% K$_2$O, Na$_2$O 2.3%, with manganese, copper and boron micronutrients;

5–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O. carbonate-free and sulfate-free;

2.5–5 kg of coarse castor powder or 1 kg of algal extract.

16. A cultivation substrate comprising at least one comminuted plant wherein the plant is of the Dicksonia genus, characterized by containing per cubic meter of cultivation substrate:

500 parts of Sorghum sp, dry, shredded, 1–3 mm;

500 parts of Miscanthus sinensis giganteus, dry-shredded, 1–5 mm;

5–15 kg of a clay mineral mixture of 70–75% montmorillonite, 15–20% illite and 3–5% quartz, with feldspar and mica as main accompanying minerals, with approximate chemical analysis: 56.5% SiO$_2$, 20.8% Al$_2$O$_3$, 5.0% Fe$_2$O$_3$, 0.3% TiO$_2$, 2.1% CaO, 3.4% MgO, 1.4% K$_2$O, Na$_2$O 2.3%, with manganese, copper and boron micronutrients;

5–15 kg of a clay mineral mixture having approximate chemical analysis of about 60% SiO$_2$, 23% Al$_2$O$_3$, 1.9% TiO$_2$, 3–8% Fe$_4$O$_3$, 0.2%CaO, 0.8% MgO, 2.2% K$_2$O and 0.3% Na$_2$O. carbonate-free and sulfate-free;

2.5–5 kg of coarse castor powder or 1 kg of algal-extract.

17. A cultivation substrate comprising at least one comminuted knot grass plant, characterized by containing per cubic meter of cultivation substrate:

333 parts of Sorghum sp., dry-shredded, 1–3 mm;

333 parts of *Miscanthus sinensis* or straw or Tompinambur (18–20% residual moisture, dry-shredded, 1–5 mm);

333 parts of waste paper, shredded into 0 5 mm stripes;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

5–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free or 1 kg of polyacrylamide granules, 1–3 mm grain size;

4–5 kg of horn chips or 2–3 kg of horn meal or 1 kg of blood meal or 1 kg of algal extract.

18. A cultivation substrate comprising at least one comminuted plant wherein the plant is a C$_4$ plant, characterized by containing per cubic meter of cultivation substrate:

333 parts of Sorghum sp., dry-shredded, 1–3 mm;

333 parts of *Miscanthus sinensis* or Tompinambur (18–20% residual moisture, dry-shredded, 1–5 mm);

333 parts of waste paper, shredded into 0 5 mm stripes;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

5–15 kg of clay mineral mixture 3 or 1 kg of polyacrylamide granules, 1–3 mm grain size;

4–5 kg of horn chips or 2–3 kg of horn meal or 1 kg of blood meal or 1 kg of algal extract.

19. A cultivation substrate comprising at least one comminuted plant wherein the plant is of the cannabis genus, characterized by containing per cubic meter of cultivation substrate:

333 parts of Sorghum sp., dry-shredded, 1–3 mm;

333 parts of *Miscanthus sinensis* or straw or Tompinambur (18–20% residual moisture, dry-shredded, 1-5 mm);

333 parts of waste paper, shredded into 0 5 mm stripes;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

5–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free or 1 kg of polyacrylamide granules, 1–3 mm grain size;

4–5 kg of horn chips or 2–3 kg of horn meal or 1 kg of blood meal or 1 kg of algal extract.

20. A cultivation substrate comprising at least one comminuted plant wherein the plant is of the Dicksonia genus, characterized by containing per cubic meter of cultivation substrate:

333 parts of Sorghum sp., dry-shredded, 1–3 mm;

333 parts of *Miscanthus sinensis or straw or Tompinambur* (18–20% residual moisture, dry-shredded, 1–5 mm);

333 parts of waste paper, shredded into 0 5 mm stripes;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

5–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free or 1 kg of polyacrylamide granules, 1–3 mm grain size;

4–5 kg of horn chips or 2–3 kg of horn meal or 1 kg of blood meal or 1 kg of algal extract.

21. A cultivation substrate comprising at least one comminuted knot grass plant, characterized by containing per cubic meter of cultivation substrate:

333 parts of Sorghum sp, dry-shredded, 1–3 mm;

333 parts of softwood chips;

150 parts of waste paper in 0.5 mm stripes or as pulp or as paper sludge;

183 parts of *Miscanthus sin.*;

1–2 kg of urea or algal extract, dissolved in 10 to 50 l of water, mixed with the above-mentioned mass;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.4% MgO, 0.6% K$_2$O, 10.0% Na$_2$O, trace elements: 5.0 mg/kg 43.0 mg/kg boron, 20.2 mg/kg cadmium, 95.0 mg/kg chromium, lead, 120.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm, grain size or 10–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free.

22. A cultivation substrate comprising at least one comminuted plant wherein the plant is a C$_4$ plant, characterized by containing per cubic meter of cultivation substrate:

333 parts of Sorghum sp, dry-shredded, 1–3 mm;

333 parts of softwood chips;

150 parts of waste paper in 0.5 mm stripes or as pulp or as paper sludge;

183 parts of *Miscanthus sin.*;

1–2 kg of urea or algal extract, dissolved in 10 to 50 l of water, mixed with the above-mentioned mass;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm, grain size or 10–15 kg of a clay mineral mixture having approximate chemical analysis of about 60% SiO$_2$, 23% Al$_2$O$_3$, 1.9% TiO$_2$, 3–8% Fe$_4$O$_3$, 0.2% MgO, 2.2% K$_2$O and 0.3% Na$_2$O, carbonate-free and sulfate-free.

23. A cultivation substrate comprising at least one comminuted plant wherein the plant is of the cannabis genus, characterized by containing per cubic meter of cultivation substrate:

333 parts of Sorghum sp, dry-shredded, 1–3 mm;

333 parts of softwood chips;

150 parts of waste paper in 0.5 mm stripes or as pulp or as paper sludge;

183 parts of *Miscanthus sin.*;

1–2 kg of urea or algal extract, dissolved in 10 to 50 l of water, mixed with the above-mentioned mass;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm, grain size or 10–15 kg of a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free.

24. A cultivation substrate comprising at least one comminuted plant wherein the plant is of the Dicksonia genus, characterized by containing per cubic meter of cultivation substrate:

333 parts of Sorghum sp, dry-shredded, 1–3 mm;

333 parts of softwood chips;

150 parts of waste paper in 0.5 mm stripes or as pulp or as paper sludge;

183 parts of *Miscanthus sin.*;

1–2 kg of urea or algal extract, dissolved in 10 to 50 l of water, mixed with the above-mentioned mass;

5–15 kg of a clay mineral mixture having approximate chemical analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm, grain size or 10–15 clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free.

25. A cultivation substrate comprising at least one comminuted knot grass plant, characterized by containing per cubic meter of cultivation substrate:

333 parts of Sorghum sp., dry-shredded, 1–3 mm;

333 parts of ground cotton waste or ground flax waste (flax tow) or ground textile waste or coconut fibers or fly ash from brown-coal combustion or brown-coal waste, leaf mold or waste paper, paper sludge or paper pulp;

333 parts of *Miscanthus sin.*;

5–15 kg of urea or horn chips or blood meal or ground castor powder or algal extract, dissolved in 10–50 l of water, mixed with the above-mentioned mass;

5–15 kg of a clay mineral mixture having approximate analysis of 50.5% SiO$_2$, 24.0% Al$_2$O$_3$, 4.0% TiO$_2$, 13.5% Fe$_2$O$_3$, 3.0% CaO, 3.4% MgO, 0.6% K$_2$O, 10.0% Na$_2$O, trace elements: 5.0 mg/kg lead. 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% SiO$_2$, 23% Al$_2$O$_3$, 1.9% TiO$_2$, 3–8% Fe$_4$O$_3$, 0.2% CaO, 0.8% MgO, 2.2% K$_2$O and 0.3% Na$_2$O, carbonate-free and sulfate-free.

26. A cultivation substrate comprising at least one comminuted plant wherein the plant is a C$_4$ plant, characterized by containing per cubic meter of cultivation substrate:

333 parts of Sorghum sp., dry-shredded, 1–3 mm;

333 parts of ground cotton waste or ground flax waste (flax tow) or ground textile waste or coconut fibers or fly ash from brown-coal combustion or brown-coal waste, leaf mold or waste paper, paper sludge or paper pulp;

333 parts of *Miscanthus sin.;*

1–2 kg of urea or horn chips or blood meal or ground castor powder algal extract, dissolved in 10–50 l of water, mixed with the above-mentioned mass;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$, carbonate-free and sulfate-free.

27. A cultivation substrate comprising at least one comminuted plant wherein the plant is of the cannabis characterized by containing per cubic meter of cultivation substrate:

333 parts of Sorghum sp., dry-shredded, 1–3 mm;

333 parts of ground cotton waste or ground flax waste (flax tow) or ground textile waste or coconut fibers or fly ash from brown-coal combustion or brown-coal waste, leaf mold or waste paper, paper sludge or paper pulp;

333 parts of *Miscanthus sin.;*

1–2 kg of urea or horn chips or blood meal or ground castor powder or algal extract, dissolved in 10–50 l of water, mixed with the above-mentioned mass;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$ carbonate-free and sulfate-free.

28. A cultivation substrate comprising at least one comminuted plant wherein the plant is of the Dicksonia genus, characterized by containing per cubic meter of cultivation substrate:

333 parts of Sorghum sp., dry-shredded, 1–3 mm;

333 parts of ground cotton waste or ground flax waste (flax tow) or ground textile waste or coconut fibers or fly ash from brown-coal combustion or brown-coal waste, leaf mold or waste paper, paper sludge or paper pulp;

333 parts of *Miscanthus sin.;*

1–2 kg of urea or horn chips or blood meal or ground castor algal extract, dissolved in 10–50 l of water, mixed with the above-mentioned mass;

5–15 kg of a clay mineral mixture having approximate analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$, carbonate-free and sulfate-free.

29. A cultivation substrate, comprising at least one comminuted knot grass plant characterized by containing per cubic meter of cultivation substrate:

333 parts of Sorghum, dry-shredded, 1–3 mm;

333 parts of waste paper 0.5 mm, shredded and moistened;

333 parts of sand and pumice, pumice 1–3 mm, in equal parts;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$, carbonate-free and sulfate-free;

1–2 kg of urea or horn chips or horn meal or blood meal or coarse castor powder, or algal extract, dissolved in 10–15 l of water, mixed with the above mass.

30. A cultivation substrate comprising at least one comminuted plant wherein the plant is a $C_4$ plant, characterized by containing per cubic meter of cultivation substrate:

333 parts of Sorghum, dry-shredded, 1–3 mm;

333 parts of waste paper 0.5 mm, shredded and moistened;

333 parts of sand and pumice, pumice 1–3 mm, in equal parts;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polacrylamide granules, 1–3 mm grain size or a clay mineral mixture having approximate chemical analysis of about 60% $SiO_2$, 23% $Al_2O_3$, 1.9% $TiO_2$, 3–8% $Fe_4O_3$, 0.2% CaO, 0.8% MgO, 2.2% $K_2O$ and 0.3% $Na_2O$, carbonate-free and sulfate-free;

1–2 kg of urea or horn chips or horn meal or blood meal or coarse castor powder, or algal extract, dissolved in 10–15 l of water, mixed with the above mass.

31. A cultivation substrate comprising at least one comminuted plant wherein the plant is of the cannabis genus, characterized by containing per cubic meter of cultivation substrate:

333 parts of Sorghum, dry-shredded, 1–3 mm;

333 parts of waste paper 0.5 mm, shredded and moistened;

333 parts of sand and pumice, pumice 1–3 mm, in equal parts;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$, 3–8% $Fe_1O_3$, 0.2% CaO, 0.8% MgO, 2.2% $K_2O$ and 0.3% $Na_2O$, carbonate-free and sulfate-free;

1–2 kg of urea or horn chips or horn meal or blood meal or coarse castor powder, or algal extract, dissolved in 10–15 l of water, mixed with the above mass.

32. A cultivation substrate comprising at least one comminuted plant wherein the plant is of the Dicksonia genus, characterized by containing per cubic meter of cultivation substrate:

333 parts of Sorghum, dry-shredded, 1–3 mm;

333 parts of waste paper 0.5 mm, shredded and moistened;

333 parts of sand and pumice, pumice 1–3 mm, in equal parts;

5–15 kg of a clay mineral mixture having approximate chemical analysis of 50.5% $SiO_2$, 24.0% $Al_2O_3$, 4.0% $TiO_2$, 13.5% $Fe_2O_3$, 3.0% CaO, 3.4% MgO, 0.6% $K_2O$, 10.0% $Na_2O$, trace elements: 5.0 mg/kg lead, 120.0 mg/kg boron, 20.2 mg/kg cadmium, 95.0 mg/kg chromium, 43.0 mg/kg cobalt, 39.0 mg/kg copper, 52.0 mg/kg nickel, 110.0 mg/kg zinc and 1600.0 mg/kg manganese;

1 kg of polyacrylamide granules, 1–3 mm grain size or a clay mineral mixture having approximate chemical analysis of about 60% $SiO_2$, 23% $Al_2O_3$, 1.9% $TiO_2$. 3–8% $Fe_4O_3$, 0.2% CaO, 0.8% MgO, 2.2% $K_2O$ and 0.3% $Na_2O$, carbonate-free and sulfate-free;

1–2 kg of urea or horn chips or horn meal or blood meal or coarse castor powder, or algal extract, dissolved in 10–15 l of water, mixed with the above mass.

* * * * *